Patented June 24, 1947

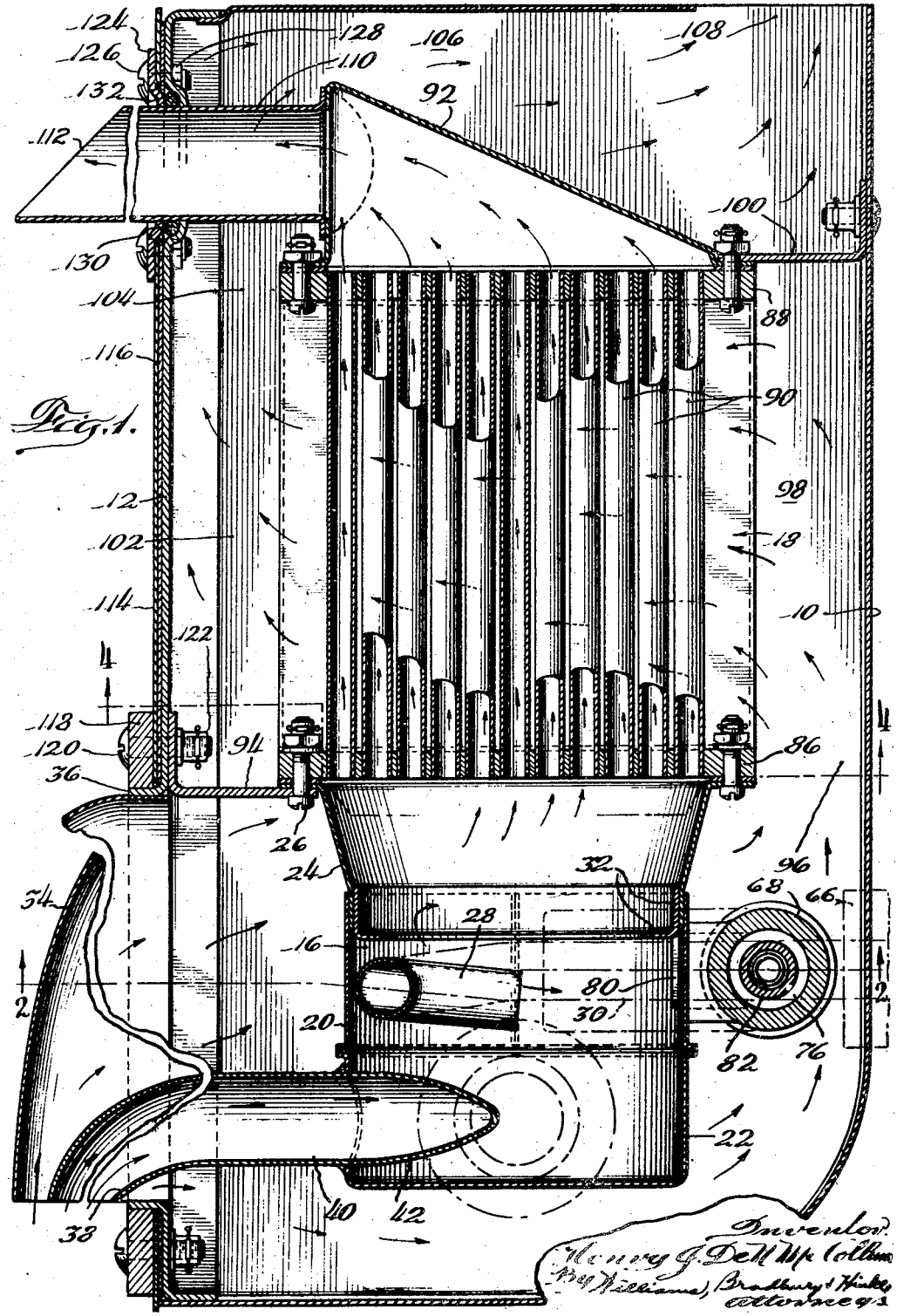

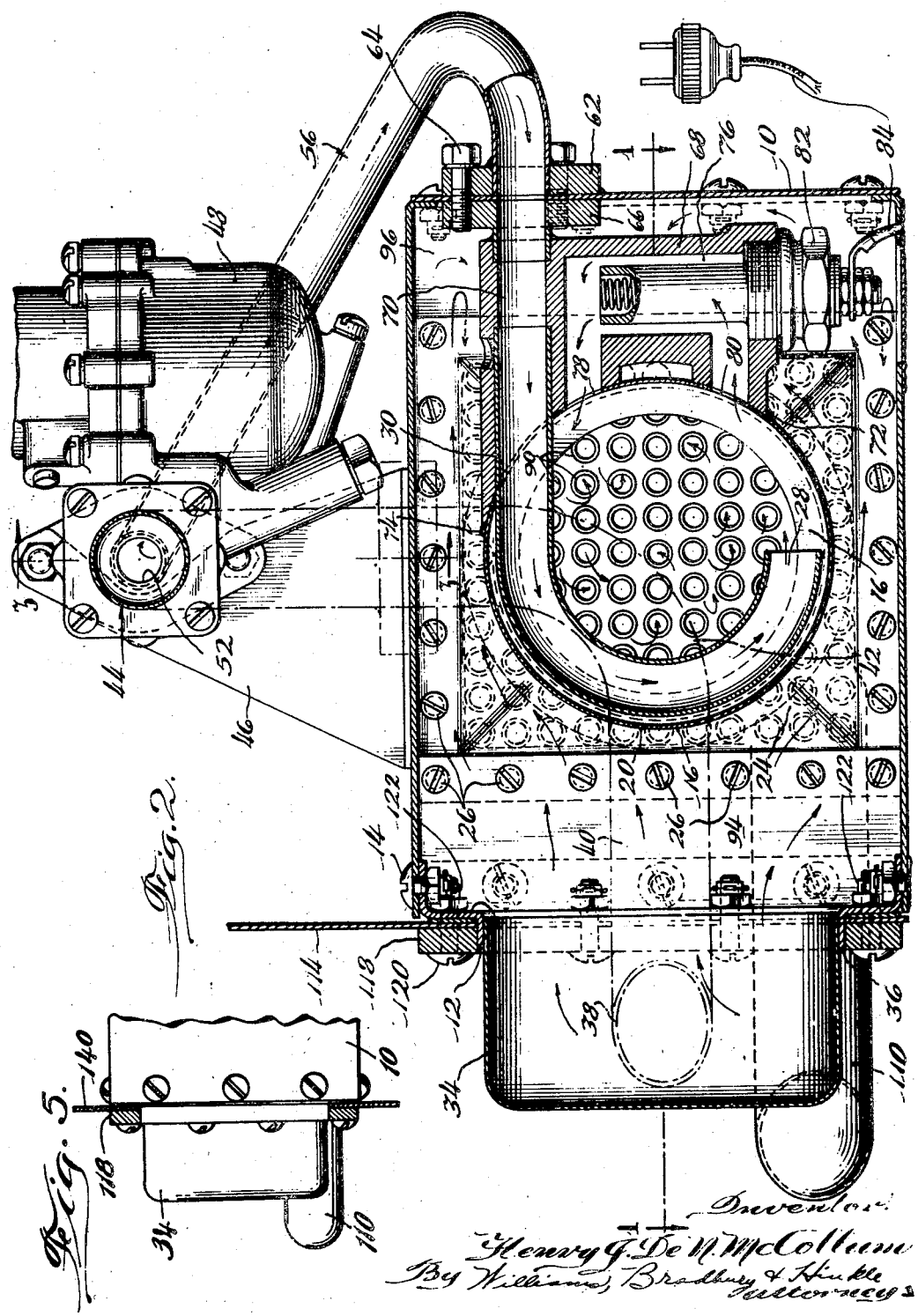

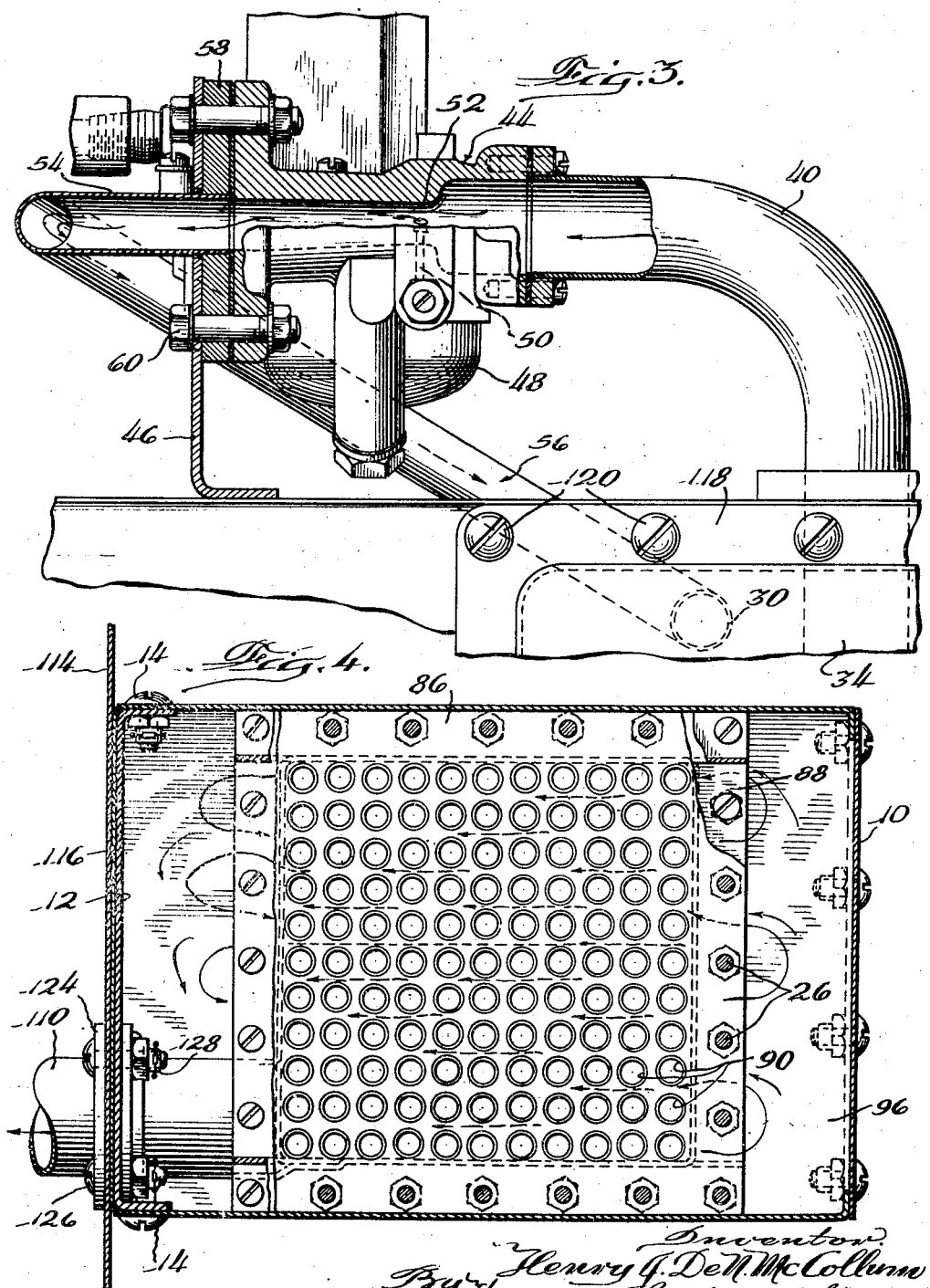

2,422,694

UNITED STATES PATENT OFFICE 2,422,694

WALL-MOUNTED RAM-TYPE AIRCRAFT HEATER

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application January 1, 1944, Serial No. 516,649

13 Claims. (Cl. 126—116)

My invention relates to heating apparatus and more particularly to internal combustion heaters for aircraft.

It is now common to provide aircraft with internal combustion heaters to heat the cabins and other parts of the aircraft while in flight. Heretofore, such heaters have been built into the aircraft structure and have formed an integral part thereof. An object of my invention is to provide a unitary self-contained aircraft heater which contains within its own structure all of the requisite operating mechanism and which can be applied to an aircraft with substantially the same ease with which the ordinary radio receiver is plugged into the lighting circuit of a dwelling.

Another object of my invention is to provide a unitary internal combustion heater for aircraft which is compact, light in weight, and highly efficient.

Another object of my invention is to provide a unitary self-contained internal combustion heater which is adapted to be located at any convenient location in the aircraft structure.

Other objects and advantages will become apparent as the description proceeds.

In the drawings:

Fig. 1 is a longitudinal sectional view showing a preferred form of my invention and is taken on the line 1—1 of Fig. 2;

Fig. 2 is a slightly irregular transverse section, taken on the line 2—2 of Fig. 1;

Fig. 3 is a partial section showing a fuel feeding mechanism and is taken on the line 3—3 of Fig. 2;

Fig. 4 is an irregular transverse section, taken on the line 4—4 of Fig. 1; and

Fig. 5 is an elevational view of a modification on a reduced scale.

The particular embodiment of my invention which I have selected for illustration comprises a sheet metal box-like housing 10 provided with a sheet metal closure 12 secured to the housing 10 by bolts 14 or in any other suitable manner. A combustion chamber 16 and heat exchanger 18 are mounted in the housing 10 in a manner hereinafter described, and means forming a unitary part of the housing 10 and its closure 12 are provided to supply combustion and ventilating air and fuel to the combustion chamber and to remove and discharge to atmosphere the hot products of combustion after these products of combustion have given up their heat to ventilating air flowing through the housing.

As clearly shown in Fig. 1, the combustion chamber 16 comprises an annular portion 20 and a cup-shaped portion 22 brazed, welded, or otherwise suitably secured to the annular portion 20. The other end of the annular portion 20 is similarly attached to a flaring throat 24 having its large end attached by bolts 26 to one end of the heat exchanger 18. Combustible mixture is delivered to the combustion chamber 16 by the rearwardly inclined outlet end 28 of an induction tube, indicated generally by the reference character 30, and a flanged ring 32 prevents unvaporized fuel from passing out of the combustion chamber into the throat 24.

A scoop-shaped ventilating air ram 34 is welded, brazed, or otherwise attached to the outwardly projecting lip 36 which forms an integral part of the closure 12 and surrounds an opening formed therein. This ventilating air ram furnishes ventilating air to the interior of the housing 10. Located in this ventilating air ram is the inlet or ram end 38 of a combustion air supply pipe 40, having a curved portion 42 lying within the combustion chamber and constituting pre-heating means for the combustion air prior to its delivery to a carburetor 44 to which the other end of the combustion air supply pipe 40 is attached.

The carburetor 44 is located outside of the housing 10 and is mounted on a bracket 46 attached to one wall of this housing. This carburetor has the usual float bowl 48 forming a source of supply for a fuel jet 50 discharging into the throat of a Venturi tube 52, wherein the combustion air and fuel are admixed to form a combustible mixture. The large end of the Venturi tube 52 is in communication with the end 54 of a pipe 56 which delivers this combustible mixture to the induction tube 30 and thence to the combustion chamber 16.

As clearly shown in Figs. 2 and 3, the end 54 of pipe 56 is provided with a flange 58 which is attached to the carburetor by bolts 60 which also serve to attach the carburetor to the bracket 46. The other end of this pipe 56 is provided with a second flange 62 attached by bolts 64 to one wall of the housing 10 and also to a nipple 66 interposed between pipe 56 and a casting 68 having a passage 70 affording communication between the nipple 66 and induction tube 30.

The casting 68 is welded or otherwise secured to the wall of the combustion chamber 16, as indicated at 72 and 74, and has an igniter chamber 76 which communicates with the combustion chamber 16 by way of openings 78 and 80 in the wall of this combustion chamber. An electrical igniter 82 is screwed into the casting 68 and constitutes means for igniting the combustible mixture delivered to the combustion chamber. This igniter may be controlled by the usual thermostatic switch (not shown), so that, in accordance with usual practice, the igniter will be disconnected from its source of electrical energy when the heater maintains normal operating temperature. The igniter 82 is supplied with current by way of an electrical conductor 84 which may be of the flexible type and provided with a plug for making a detachable connection with a wiring circuit of the aircraft. In the particular form shown, the igniter is grounded through the housing and body of the aircraft, and, since the igniter requires only a very low voltage, this arrangement is satisfactory for most installations.

If, however, it is not desirable to utilize the structure of the aircraft as a part of the igniter circuit, a two wire flexible electric cord may be utilized to detachably connect the igniter to any suitable source of current in the same manner in which lamps or other electrical appliances are connected into the lighting circuit of the ordinary dwelling.

The hot gases of combustion created in the combustion chamber flow through the throat 24 into one end of the heat exchanger 18. This heat exchanger is the subject matter of my copending application, Serial No. 516,648, filed January 1, 1944, wherein this heat exchanger is described in detail and claimed per se. For purposes of the instant application, it will suffice to point out that this heat exchanger comprises, in general, headers 86 and 88 connected by tubes 90 through which the combustion gases flow in passing from the throat 24 to an exhaust manifold 92 attached to the other end of the heat exchanger. As most clearly shown in Fig. 4, the headers 86 and 88 are of the same height as the housing 10 and extend from the upper wall to the lower wall of this housing. These headers, however, are of less width than the housing, and a partition 94 connects one end of the header 86 with the closure 12. The partition 94 performs the dual function of forming a support for one end of the heat exchanger and the combustion chamber attached thereto and of directing the ventilating air over the exterior walls of the combustion chamber and throat in a direction generally parallel to the header 86.

This ventilating air absorbs heat from the walls of the combustion chamber 16 and throat 24 and passes through the elongated opening 96 between the housing 10 and the other end of header 86 into the space 98 at one side of the heat exchanger 18. This ventilating air then flows between the tubes 90 of the heat exchanger and absorbs additional heat from the walls thereof. A second partition 100 closes the right hand end of the space 98 and forms a support for the header 88 and exhaust manifold 92. After the ventilating air has passed through the heat exchanger, it enters a space 102 on the opposite side thereof and then flows through the elongated opening 104 between closure 12 and header 88 into a ventilating air chamber 106. The housing 10 is provided with a ventilating air outlet 108 through which the heated ventilating air passes from the chamber 106 into the aircraft cabin or other space to be heated.

The cooled products of combustion are discharged to atmosphere through an exhaust pipe 110 attached to the exhaust manifold 92 and extending through a suitable opening in the cover 12. This exhaust pipe has an oblique outlet end 112 so positioned that the forward movement of the aircraft tends to suck the exhaust gases out of this pipe and thereby facilitate flow of combustion air, combustible mixture, and combustion gases through the heater. This exhaust pipe 110 is preferably made as short as possible and, in Fig. 2, is shown as extending outwardly from the housing only a short distance beyond the ventilating air ram 34. This short exhaust pipe reduces weight and drag on aircraft and does not act as a sounding board producing objectionable noises. Because of the high efficiency of the heat exchanger 18 and the shortness of the exhaust pipe 110, the heater operates quietly and it is unnecessary to provide acoustic chambers or other equivalent muffling means to absorb sound vibrations resulting from heater operation.

In the drawings, the heater is shown as being attached to the wall 114 of an aircraft cabin or other structural part of an aircraft which has been cut away to provide openings through which the exhaust pipe 110 and flange 36 and the associated ram structure project. A gasket 116 is preferably interposed between the wall or skin of the aircraft and the closure portion 12 of the housing. The housing is attached to the aircraft skin by any suitable and convenient attaching means. In the particular embodiment shown, a ring 118 is located on the outside of the aircraft skin surrounding the opening therein for the ram structure, and screws 120 pass through this ring and through suitable openings in the skin of the aircraft and closure 12 and screw into nuts 122 attached to the inner wall of the closure 12. A second ring 124 surrounds the opening for the exhaust pipe 110 and screws 126 attach this ring to nuts 128 provided by the closure 12. A sealing gasket 130 is preferably located in an annular depression formed in the closure 12 and is urged into sealing engagement with the exhaust pipe 110 by an inwardly projecting lip 132 on the ring 124, so that no exhaust gases can flow back along the exhaust pipe 110 and into the ventilating air.

In lieu of attaching the heater to the wall of an aircraft cabin or other structure, the heater can be mounted on a panel which can be inserted in the window opening or in any other suitable opening in the wall of a transport plane or other aircraft. In Fig. 5 I have illustrated the heater as mounted on such a panel 140. In other words, it is only necessary to provide an arrangement whereby the ventilating and combustion air rams and the exhaust pipe can project into the air stream caused by forward motion of the aircraft, in order that the heater may operate properly from the normal operation of the aircraft. The rams and exhaust pipe are rigidly mounted in the housing so that they have a fixed size and positional relationship relative to each other and the person making the installation need not concern himself with the relative proportions or arrangements of these parts.

After the heater has been installed in any suitable location, the fuel inlet of the carburetor is connected by suitable piping to any desirable source of fuel, such as one of the fuel tanks which supplies an aircraft engine or a special fuel tank for heating or other auxiliary purposes only. The electrical conductor for the igniter is then connected to a suitable source of current as by plugging the free end of this conductor into an electrical circuit of the aircraft. The heater can be easily removed for inspection, repair or replacement and is entirely independent of the structure of the aircraft, except that the heater is supported thereon by any suitable means.

While I have illustrated and described only a single embodiment of my invention, it is to be understood that my invention is not limited to the particular details shown and described, but that my invention includes all variations, modifications and equivalents coming within the scope of the following claims.

I claim:

1. A unitary self-contained aircraft heater comprising a housing adapted to be attached to an outer wall of an aircraft, means forming a combustion chamber mounted in said housing, a heat exchanger mounted in said housing and receiving hot products of combustion from said combustion chamber, a carburetor carried by said housing and supplying combustible mixture to said combustion chamber, ram means projecting from said housing for supplying combustion air to said carburetor and ventilating air to said heat exchanger, said housing having an outlet adapted to discharge ventilating air directly into the aircraft, and an exhaust pipe for combustion gases leaving said heat exchanger, said exhaust pipe projecting from said housing into the slip stream of the aircraft, said ram means and exhaust pipe being rigidly attached to said housing with said exhaust pipe located downstream of said ram means.

2. A unitary self-contained aircraft heater comprising a housing adapted to be attached to an outer wall of an aircraft, means forming a combustion chamber mounted in said housing, a heat exchanger mounted in said housing and receiving hot products of combustion from said combustion chamber, a carburetor carried by said housing and supplying combustible mixture to said combustion chamber, ram means projecting from said housing for supplying combustion air to said carburetor and ventilating air to said heat exchanger, said housing having an outlet adapted to discharge ventilating air directly into the aircraft, an exhaust pipe for combustion gases leaving said heat exchanger, said exhaust pipe projecting from said housing into the slip stream of the aircraft, said ram means and exhaust pipe being rigidly attached to said housing with said exhaust pipe located downstream of said ram means, and means for preheating said combustion air.

3. A unitary self-contained aircraft heater comprising a housing adapted to be removably attached as a unit to an outer wall of an aircraft, means forming a combustion chamber mounted in said housing, a heat exchanger mounted in said housing and receiving hot products of combustion from said combustion chamber, means carried by said housing and supplying combustible mixture to said combustion chamber, means projecting from said housing for supplying combustion air to said carburetor and ventilating air to said heat exchanger, said housing having an outlet adapted to discharge ventilating air directly into the aircraft, and an exhaust pipe for combustion gases leaving said heat exchanger, said exhaust pipe projecting from said housing into the slip stream of the aircraft, said exhaust pipe and air supply means being fixedly attached to said housing with the exhaust pipe located downstream of said supply means.

4. A unitary self-contained aircraft heater comprising a housing adapted to be attached to an outer wall of an aircraft, means forming a combustion chamber mounted in said housing, a heat exchanger mounted in said housing and receiving hot products of combustion from said combustion chamber, a carburetor carried by said housing and supplying combustible mixture to said combustion chamber, rams projecting from said housing for supplying combustion air to said carburetor and ventilating air to said heat exchanger, said housing having an outlet adapted to discharge ventilating air directly into the aircraft, an exhaust pipe for combustion gases leaving said heat exchanger, said exhaust pipe projecting from said housing into the slip stream of the aircraft, said rams and exhaust pipe being fixedly attached to said housing with the exhaust pipe located downstream of said rams, an igniter for said combustion chamber, and means for detachably connecting said igniter with a source of current.

5. A unitary self-contained internal combustion heater for aircraft comprising a housing having a pair of openings in one wall thereof, means for attaching said housing to the skin of an aircraft, a pair of rams projecting from one of said openings, an exhaust pipe projecting from the other of said openings, means forming a combustion chamber located in said housing, means interposed between said combustion chamber and one of said rams for supplying a combustible mixture to said chamber, a heat exchanger located in said housing, means connecting said heat exchanger to said combustion chamber so as to receive the hot products of combustion therefrom, means connecting said heat exchanger to said exhaust pipe so that said products are discharged into said exhaust pipe, and means connecting the other of said rams to deliver ventilating air to said housing.

6. A unitary self-contained internal combustion heater for aircraft comprising a sheet metal housing having a pair of openings in one wall thereof, means provided by said wall for attaching said housing to the skin of an aircraft, a pair of rams projecting from one of said openings, an exhaust pipe projecting from the other of said openings, means forming a combustion chamber located in said housing, means interposed between said combustion chamber and one of said rams for supplying a combustible mixture to said chamber, a heat exchanger located in said housing, means connecting said heat exchanger to said combustion chamber so as to receive the hot products of combustion therefrom, means connecting said heat exchanger to said exhaust pipe so that said products are discharged into said exhaust pipe, and means in said housing for directing ventilating air supplied by said other ram over said heat exchanger.

7. A unitary self-contained internal combustion heater for aircraft comprising a housing forming a passage for ventilating air, means for attaching said housing to the skin of an aircraft, a ram projecting from said housing and adapted to supply ventilating air to one end thereof, a heat exchanger located in said housing in the path of said ventilating air, means forming a combustion chamber in said housing for supplying hot products of combustion to said heat exchanger, a carburetor attached to said housing for supplying a combustible mixture to said combustion chamber, a second ram for supplying combustion air to said carburetor, said second ram projecting from said housing, and an exhaust pipe projecting from said housing into the slipstream of the aircraft and delivering to atmosphere combustion gases discharged from said heat exchanger, said exhaust pipe having a rearwardly directed outer end opening to produce a vacuum when said aircraft is in motion and projecting from the same side of said housing as said ventilating and combustion air rams.

8. A unitary self-contained internal combustion heater for aircraft comprising a housing forming a passage for ventilating air, means for attaching said housing to the skin of an aircraft, a ram projecting from said housing adapted to supply ventilating air to one end thereof, said housing having an outlet adapted to discharge ventilating air directly into the aircraft, a heat exchanger located in said housing in the path of said ventilating air, means forming a combustion chamber in said housing for supplying hot products of combustion to said heat exchanger, a carburetor attached to said housing for supplying a combustible mixture to said combustion chamber, a second ram for supplying combustion air to said carburetor, said second ram projecting from said housing, and an exhaust pipe projecting from said housing into the slipstream of the aircraft and discharging combustion gases received from said heat exchanger.

9. A unitary self-contained internal combustion heater for aircraft comprising a housing forming a passage for ventilating air, a ram projecting from said housing adapted to supply ventilating air to one end thereof, a heat exchanger located in said housing in the path of said ventilating air, means forming a combustion chamber in said housing for supplying hot products of combustion to said heat exchanger, a carburetor attached to said housing for supplying a combustible mixture to said combustion chamber, a second ram for supplying combustion air to said carburetor, said second ram projecting from said housing, an exhaust pipe projecting from said housing and delivering combustion gases discharged from said heat exchanger, said exhaust pipe projecting from the same side of said housing as said ventilating and combustion air rams, and a supporting panel for said heater adapted to mount said heater in the aircraft so that said ventilating and combustion air rams and said exhaust pipe project into the slipstream of the aircraft.

10. A unitary self-contained internal combustion heater for aircraft comprising a sheet metal housing including a removable closure, a heat exchanger located in said housing and having a width equal to that of said housing but having a height less than that of said housing, a partition attaching one end of said heat exchanger to said closure, a partition attaching the other end of said heat exchanger to a wall of said housing opposite said closure, said closure having a pair of openings therein and means for attaching said housing to a supporting structure, a ventilating air ram attached to said closure and projecting from one of said openings, means forming a combustion chamber attached to one end of said heat exchanger and supplying hot products of combustion thereto, said first named partition being adjacent said ram and combustion chamber whereby said partitions direct the ventilating air from said ram over said combustion chamber and said heat exchanger, a second ram projecting through said last-named opening, a carburetor attached to said housing and mounted exteriorly thereof, a pipe connecting said second ram with said carburetor and extending through said combustion chamber, a second pipe for delivering combustible mixture from said carburetor to said combustion chamber, an exhaust manifold attached to said heat exchanger and receiving combustion gases therefrom, and an exhaust pipe attached to said manifold and projecting through the other opening in said closure.

11. A unitary self-contained internal combustion heater for aircraft comprising a sheet metal housing, a heat exchanger located in said housing and having a width equal to that of said housing but having a height less than that of said housing, a partition attaching one end of said heat exchanger to said closure, a partition attaching the other end of said heat exchanger to a wall of said housing opposite said closure, said housing having a pair of openings therein and means for attaching it to a supporting structure, a ventilating air ram projecting from one of said openings, means forming a combustion chamber attached to one end of said heat exchanger and supplying hot products of combustion thereto, said first named partition being adjacent said ram and combustion chamber whereby said partitions direct the ventilating air from said ram over said combustion chamber and said heat exchanger, a second ram projecting through said last-named opening, a carburetor attached to said housing and mounted exteriorly thereof, a pipe connecting said second ram with said carburetor, a second pipe for delivering combustible mixture from said carburetor to said combustion chamber, an exhaust manifold attached to said heat exchanger and receiving combustion gases therefrom, and an exhaust pipe attached to said manifold and projecting through the other opening in said housing.

12. A unitary self-contained internal combustion heater for aircraft comprising a housing including a removable closure, a heat exchanger located in said housing, a partition attaching one end of said heat exchanger to said closure, a partition attaching the other end of said heat exchanger to a wall of said housing opposite said closure, said closure having openings therein and means for attaching said housing to a supporting structure, a ventilating air ram attached to said closure and projecting from one of said openings, means forming a combustion chamber attached to one end of said heat exchanger and supplying hot products of combustion thereto, said first named partition being adjacent said ram and combustion chamber whereby said partitions direct the ventilating air from said ram over said combustion chamber and said heat exchanger, a second ram projecting through one of said openings, a carburetor attached to said housing, a pipe connecting said second ram with said carburetor, a second pipe for delivering combustible mixture from said carburetor to said combustion chamber, and an exhaust pipe attached to said heat exchanger and projecting through an opening in said closure.

13. A unitary self-contained internal combustion heater for aircraft comprising a sheet metal housing including a removable closure, a heat exchanger supported in said housing, said closure having a pair of openings therein and means for attaching said housing to a supporting structure, a ventilating air ram attached to said closure and projecting from one of said openings, means forming a combustion chamber attached to one end of said heat exchanger and supplying hot products of combustion thereto, a second ram projecting through said last-named opening, a carburetor attached to said housing and mounted exteriorly thereof, a pipe connecting said second ram with said carburetor and extending through said combustion chamber, a second pipe for delivering combustible mixture from said carburetor to said combustion chamber, an exhaust manifold attached to said heat exchanger and receiving combustion gases therefrom, and an exhaust pipe attached to said manifold and projecting through the other opening in said closure.

HENRY J. DE N. McCOLLUM.

REFERENCES CITED

The following references are of record in the file of this patent:

UNITED STATES PATENTS

| Number | Name | Date |
|---|---|---|
| 1,357,598 | Thompson | Nov. 2, 1920 |
| 286,341 | Spear | Oct. 9, 1883 |
| 2,321,940 | Robertson | June 15, 1943 |